Jan. 21, 1936.　　　A. C. HAMILTON　　　2,028,207

WHEEL AND BRAKE THEREFOR

Filed June 5, 1931　　　3 Sheets-Sheet 1

INVENTOR
Alexander C. Hamilton
BY HIS ATTORNEY

Jan. 21, 1936.　　A. C. HAMILTON　　2,028,207
WHEEL AND BRAKE THEREFOR
Filed June 5, 1931　　3 Sheets-Sheet 2

INVENTOR
Alexander C. Hamilton
BY HIS ATTORNEY

Jan. 21, 1936.  A. C. HAMILTON  2,028,207
WHEEL AND BRAKE THEREFOR
Filed June 5, 1931  3 Sheets-Sheet 3
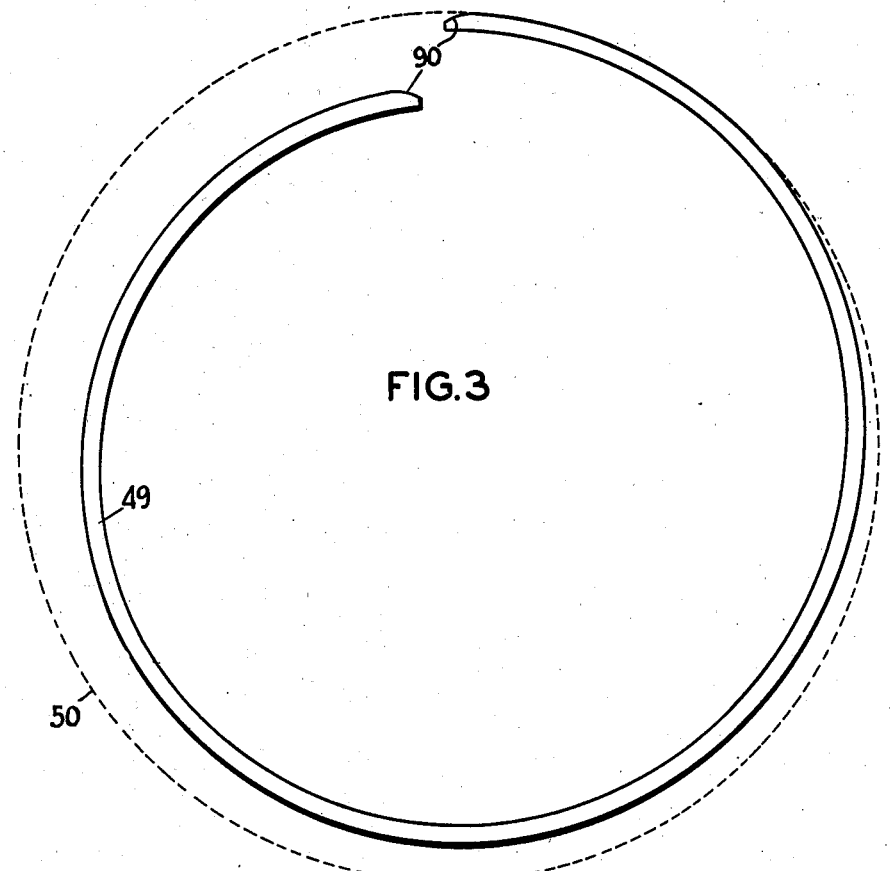
FIG.3
FIG. 4
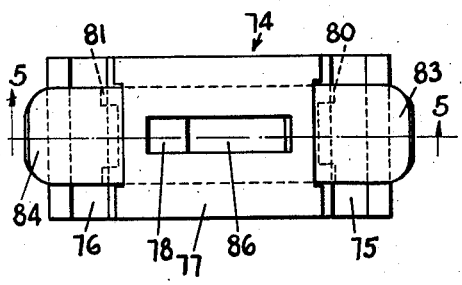
FIG. 5
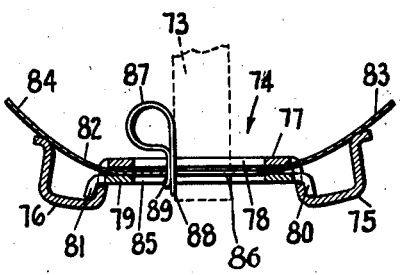
INVENTOR
Alexander C. Hamilton
BY HIS ATTORNEY Patented Jan. 21, 1936

2,028,207

UNITED STATES PATENT OFFICE 2,028,207

WHEEL AND BRAKE THEREFOR

Alexander C. Hamilton, Pleasant Ridge, Mich., assignor, by mesne assignments, to Hayes Industries, Inc., Jackson, Mich., a corporation of Michigan Application June 5, 1931, Serial No. 542,305

24 Claims. (Cl. 188—78)

This application in one of its aspects relates to wheels shown, by way of example, as applied to aircraft, but it may be applied to various other types of vehicles.

In another aspect the invention relates to brakes and, by way of example, is shown as cooperating with a brake drum attached to landing wheels of aircraft, but it may be applied to wheels of automobiles or any other type of vehicle.

One object of the invention is to produce a wheel having spaced slanting sides with rigid cross vanes, thereby producing a supporting arch of great strength compared to the weight of the wheel.

Another object of the invention is to combine reversely inclined roller bearings beneath the sloping sides of the wheel to take the direct thrust through these sides.

Another object of the invention is to so construct the braking apparatus associated with the wheel and the cover therefor, that there will be ample cooling of the brake band and friction lining.

Another object of the invention is to provide side farings for the wheel to produce a stream line effect and decrease the resistance to movement through the air, in other words, to decrease the windage.

Another object of the invention is to construct a brake with a flexible internal brake band stressed to assume, when unconstrained, a form.

Another object of the invention is to construct a brake with internal brake band of spring material tending to release itself independently of separate spring parts.

Another object of the invention is to construct a brake so that the surface of the brake applied to the rotating part varies with the pressure on the brake operating lever.

Another object of the invention is to construct the braking mechanism so that the movable end of the brake band is moved radially as well as circumferentially to apply a braking force that varies with the pressure applied to the lever.

Another object of the invention is to construct the brake band in spiral form so as to have the clearance gradually increase from one end of the band to the other.

Another object of the invention is to frictionally support the brake band in an intermediate position with limited free movement so that the point of support will automatically shift as the clearance is increased by wear of the braking surface.

Another object of the invention is to move the free end of the band so that the braking surfaces can be brought together without bringing the free end of the band into engagement with the movable braking surface.

Another object of the invention is to move the free end of the band by a lever of such length and center of rotation as to preclude the end portion of the band from contacting with the movable braking surface throughout the life of the brake.

Another object of the invention is to provide arrangements for protecting the bearing from dust and other particles.

Other objects will appear in the following description, reference being had to the drawings, in which:

Fig. 3 is an elevation of the brake band made of spring material and formed to assume a spiral shape when disconnected from the other parts.

Fig. 4 is a plan view of the centering device shown in Fig. 2, the spring being omitted and the brake being applied.

Fig. 5 is a section taken on the line 5—5 of Fig. 4.

In disk wheels having two disk sides in prior constructions the sides have usually been arranged substantially normal to the axis of rotation and when inclined from this axial plane in other types of constructions the bracing effect has been obtained through the bearing hub. In my type of wheel the two sides of the disk wheel are arranged to slant towards each other from the axis to the rim and a plurality of cross vanes extend between the sides to give an arch effect entirely independent of the hub. In fact, in my type of wheel the usual hub between the sides has been omitted.

In prior types of band brakes, particularly of the internal type, the band has been formed of non-resilient material and has been made of circular form when unconstrained. For this reason the internal band when pressure is applied in these prior types suddenly contacts throughout its entire surface and causes the brake to "grab". This results in a too sudden application of braking force. Also, in these prior types, the movable end or ends of the band have generally been made so that the free end or ends gouge the rotating braking surface when the brake is applied. In other types the brake end has been designed to move circumferentially only to prevent the ends of the band from contacting with the braking surface. While this may prevent gouging of the band of the braking surface it does not properly apply the braking surfaces and has been unsuccessful in practice.

In my construction the brake band is rolled or otherwise formed of spring steel or other suitable material so as to have a spiral shape before it is mounted in position in the brake drum. When the brake is assembled the spiral band is expanded to have a proper clearance, gradually increasing in amount from one end of the band to the other though measurably satisfactory results may be obtained by expanding during assembling this spiral band so that the clearance will be uniform from one end to the other.

In prior types of clearance, adjusting means have been proposed for automatically shifting the brake band to provide for wear, but there has been no provision to permit the brake band to shift to open position against spring pressure in the clearance adjuster.

In my improved clearance adjuster I arrange the adjusting device in an intermediate portion of the band so that it has limited play for setting and releasing the brake without shifting the adjuster and this limited movement is opposed by a spring between shiftable limited stops independently of the spring that returns the free end or ends of the band to released position.

The foregoing improvements and others will now be described in complete detail.

Figure 1:
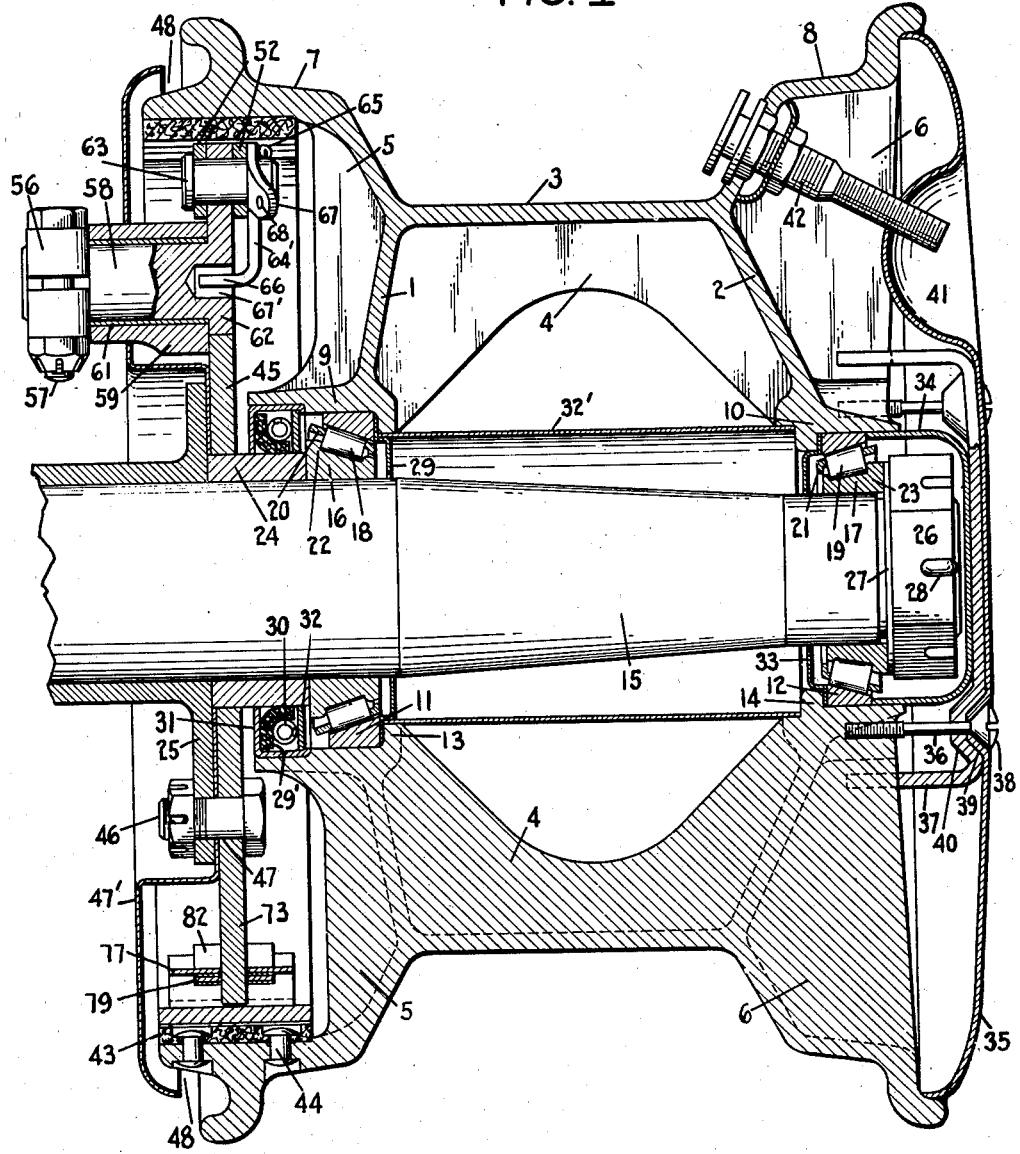
Fig. 1 is a sectional elevation through an airplane wheel with the brake attached thereto, the section being taken on the line 1—1 of Fig. 2.

Referring to the drawings, in Fig. 1 the wheel is preferably cast of some light material such as aluminum alloy so as to have two sides 1, 2, sloping from the axis towards the rim 3. These sides are not joined at the center by the usual hub member. The bracing or arch effect is produced by a plurality of webs 4 cast integrally with the sides. These webs may also extend beyond the sides at 5 and 6 to directly support the edges 7 and 8 of the rim on which the tire, not shown, is positioned. I prefer to arrange these extension veins 5 and 6 in direct alignment with the internal veins 4 but they may be staggered in relation to the internal veins with like results. Small bearing sections 9, 10, are cast integrally with the sides 1 and 2 to present a cylindrical cavity in which outer bearing cones 11 and 12 fit. These bearing cones rest against downturned flanges 13, 14, integral with the cylindrical members 9 and 10. The wheel is adapted to be mounted on an axle 15 preferably of cone shape, as shown. On the larger end of the cone axle is mounted the inner bearing member 16 and on the smaller end of the cone is mounted the inner bearing member 17. A series of rollers 18, 19, which may be either spherical, cylindrical or conical, are placed in the raceway between the bearing members suitably held in spaced relation by cages 20 and 21 of standard construction. The bearing members 16 and 17 have thrust flanges 22, 23, to take the thrust of the rollers.

The inner raceway 16 is adapted to abut against sleeve 24 on the axle 15 which abuts against the flange member 25 fastened to the supporting gear (not shown) of the aircraft.

The inner bearing member 17 is held in position by nut 26 threaded on the reduced end of the shaft 15. A washer 27 is preferably placed between this nut and the bearing member 17. The nut may be of the castellated type held in adjusted position by means of the usual split key 28 threaded through a hole in the shaft.

To prevent dust from entering the bearing of the wheel an inner disk 29 is placed between the outer bearing member 11 and the flange 13. A dust pad 29' held in place by coil spring 30 is enclosed in a cap 31 fitting over ring 32. The end of the cap 31 may be bent inwards to hold the ring 32 in position so that the dust pad and its associated parts may be removed as a unit from which the pad and spring may be removed by pulling inwardly after the assembly is removed from the wheel. This assembly fits inside of the extension 9 and over the sleeve 24. An internal dust sleeve 32' fits inside the flanges 13 in such a way that it may be removed to the left in Fig. 1 when the wheel is removed from the axle and the bearing and dust cap assembly is removed. Each of the bearing members would be filled with oil or grease and would be retained in place by the dust caps and disk which also act as lubricant containers.

The outer bearing is protected from dust and foreign material by inner disk 33 clamped between the bearing member 12 and the thrust flange 14. Enclosure of the bearing member is provided by dust cap 34 which surrounds the nut 26 and abuts against the bearing member 12 inside the extension 10.

The outer disk 2 of the wheel is enclosed by faring 35 to produce a stream line effect and reduce the windage. This faring fits inside the outer edge of rim 8 and is held in place by screws 36 which clamp the faring against a U-shaped bracket 37. This bracket may have a notch in each of its ends so as to straddle two diametrically opposed vanes 6. Screws 36 have a reduced portion between the threads and the head 38 so that they may be forced through the conical seat 39 in the faring and a similar conical seat 40 in the supporting bracket 37. The hole in these conical seats is made sufficiently small to prevent the threaded portion 36 from dropping out when the faring and supporting bracket are removed from the wheel but yet permit of the threaded portion being forced therethrough by a screw driver. If desired, this hole may be slightly threaded to facilitate the screw being entered.

The faring is stamped with a depression 41 with an appropriate hole therethrough to receive the end of air nipple 42 fastened to the rim 8 and connecting with the inner tube of the tire, not shown. By means of this nipple the tire may be inflated without removing the faring.

The rim portion 7 has a friction brake surface 43 fastened to it by rivets 44 or other appropriate fastening devices. Arranged inside of this portion of the wheel is an anchor plate 45 fastened to the flange 25 by means of appropriate bolts 46 extending through the holes 47. These bolts may have the usual castellated nuts and split keys or the parts may be held in position by riveting and spot welding if desired. The braking apparatus is enclosed by faring 48' shaped as shown and clamped between the torque plate 45 and the flange 25. This faring is spaced from the rim of the wheel at 48 to permit air to flow around the braking parts to cool the braking surface.

The anchor plate 45 is accurately positioned in respect to the wheel as it fits snugly over the bushing 24 which likewise fits snugly over the surface of revolution of the axle. Since the wheel and bearing also accurately fit over a surface of revolution of this axle the anchor plate always positions the brake parts with the same clearance in respect to the wheel.

The brake part of my invention is made of spring steel or other appropriate material and is coiled into spiral shape, as shown at 49 in Fig. 3, the dotted line 50 showing the departure from circular form. This brake band has secured at one end two similarly shaped and spaced ears 51 (Fig. 2) and at the other end two similarly shaped and spaced ears 52. These ears have their edges arc welded to the ends of the brake band. The welding, however, should preferably stop short of the ends 54 as this will insure that the temper of the band will not be destroyed near the ends 54 of the ears. This prevents the band from taking a permanent set adjacent the ends during the bushing operation.

The ears 51 are fastened to the torque plate 45 by pin 55 which passes through the holes in the ears and torque plate 45.

Brake operating arm 56 has one end connected to the brake operating rod (not shown) and the other end is clamped by bolt 57 to shaft 58 pivotally supported in bearing member 59, riveted, bolted or otherwise fastened at 60 to the torque plate. A bronze or other bearing sleeve 61 may be interposed between the shaft and the bearing member. The shaft 58 has an integral lever arm 62 movable in the cut-out portion of the torque plate shown in dotted lines at 63, 64. This lever arm is pivotally secured between the ears 52 by pin 63 which also passes through bell crank clip 64'. This pin is secured in position by any means such as split key 65. One end 66 of the clip extends into hole 67' in the shaft 58 to prevent the clip from turning. The other end 67 of this clip is pierced at 68 to receive one end of spring 69. The other end of this spring is fastened to an extension 70 of the torque plate by means of pin 71. The function of this spring is to move the ears 52 and the free end of the brake band inwardly when pressure is released on brake arm 56.

The length of lever arm 62 and the location of shaft 58 and pin 63 are such that the ends 72 or any part of the ears 52 or the end of the brake band 49 can never be brought into engagement with the friction lining 43 by movements of the lever arm 62 even when the brake lining is new and unworn. This prevents gouging of the lining by these parts. The length of the lever arm 62 and the location of shaft 58 and ends 72 are such that the end of the brake band 49 is moved radially outward as well as circumferentially for reasons to be given later, but the outer parts move substantially in a circle that is within the inner surface of the lining and eccentric to the drum.

By securing the inner end of the bell crank clip in the shaft 58 the effect of spring 69 is not diminished as the braking surface wears and the arm 62 is moved further and further around its pivot point 58. If the clip turned freely on the pin 63 the effect of this spring would be greatly reduced as the braking surface wears.

By mounting the friction lining on the rotating part of the wheel uniform wear of the lining is assured. The stationary metal band 49 being of spring material preferably of high carbon content lasts throughout the life of the brake with practically no wear. The brake band must be periodically adjusted to allow for the uniform wear of the friction lining and I have provided an automatic adjustment to rivet the brake band after the clearance has reached a predetermined extent. This is provided for in the centering device cooperating with projection 73. A strap 74 consists of two U-shaped ends 75, 76, joined by a center part 77 which has a slot 78 in which the projection 73 extends. The bottom of the U-shaped ends 75 and 76 are spot welded or otherwise fastened to the brake band 49. The inner sides of the ends 75, 76, have slots through which extend a friction plate 79. The ends of this plate preferably are downturned at 80 and 81. A friction strip 82 of thin spring material passes through the slots in the inner sides of the end pieces 75, 76, in contact with the upper surface of friction plate 79. The ends 83, 84, of this strip are bent to pass over the ends of the U-shaped members 75, 76, as shown in Fig. 5. The plate 79 has a slot 85 substantially of the same length as the slot 78. The strip 82 has a slot 86 of less length than the slot 78. A leaf spring 87 has one side 88 extending downwardly in contact with the left-hand edge of the extension 73 in Fig. 5 and is reversely bent so that its other end 89 passes through the slot 86. This end 89 is preferably curved to the left in Fig. 5 so as to retain the leaf spring in place after it is once inserted. This construction is such that there is limited play under control of leaf spring 87 in the slot 86 to take care of the normal movement of the brake band from release to set position, the spring tending to force the strip, strap and brake band to release position.

The operation of the brake will now be described.

Figure 2:
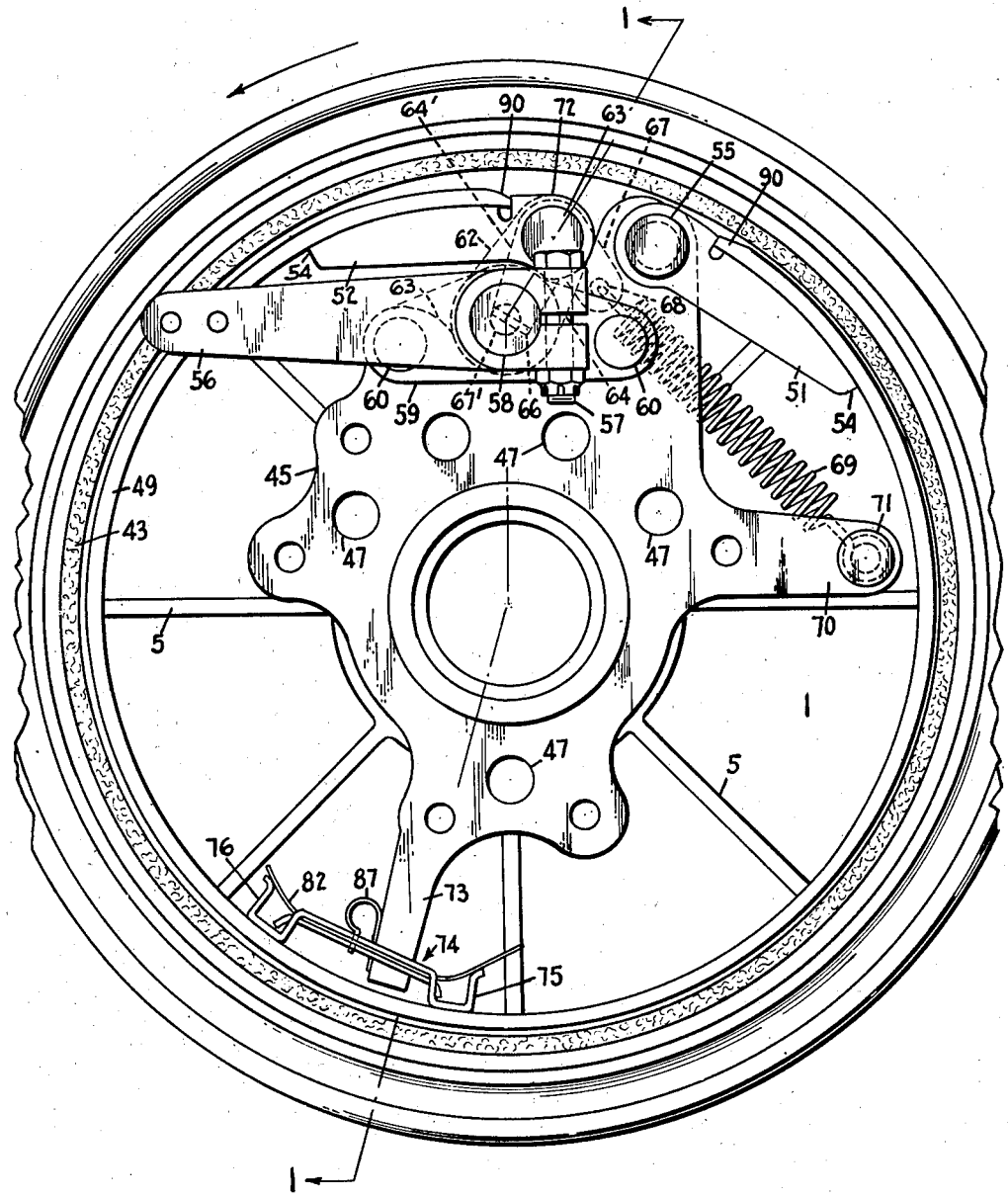
Fig. 2 is an elevation of the wheel viewed from the left of Fig. 1 the brake being in retracted position.

When the airplane lands pressure on the brake pedal, not shown, will apply pressure to the brake arm 56 in the direction of the arrow in Fig. 2. This will force the brake band circumferentially against tension of spring 69. The first movement brings the brake band near its stationary end directly into contact with the rotating friction lining. The other parts of the brake band are not at this time brought into engagement with the band because of the gradually increasing clearance between the spiral band and the lining. Continued pressure brings more and more of the surface of the spiral band into contact with the friction lining, gradually increasing the braking action. As movement of the brake arm is continued substantially all of the brake band surface is brought into contact with the friction lining giving maximum braking effect. The bringing into engagement of the movable end of the brake band with the friction lining is materially aided by the fact that the short brake arm 62 moves the brake band end in a radial direction as well as in a circumferential direction, thus forcing substantially all of the brake band, except the short portion of the end, into firm contact with the rotating lining. This is an important feature of the invention. While the parts are so designed that the extreme end of the brake band 49 will not be quite brought into engagement with the friction lining, nevertheless, I prefer to champfer this lining at 90 to prevent gouging if the extreme end should be brought into engagement with the lining.

As the brake is being set in the operation just referred to, the bracket 74 together with the strip 82 moves counter clockwise in Fig. 2, compressing spring 87. When the brake is released the band will gradually be brought out of contact with the friction lining by the inherent stress in the brake band which will "peel" itself off of the drum. The lever arm 56 and associated parts are moved to released position. This spring also aids in the release of the band by spring 69 from the drum. The brake band and the centering device will be moved clockwise in Fig. 2 by spring 87 until the projection 73 engages with the right-hand end of slot 86 of strip 82 in Fig. 5. In released position this projection engages with this end of the slot. This spring, however, is not of sufficient strength to move the strip 82 along the friction surface of plate 79.

As the brake lining wears, strap 74 and strip 82 will be moved further and further until the projection 73 compresses the spring 87 until contact is made between the two ends of the spring and the left-hand end of the slot 88 in Fig. 5. As the wear increases, projection 73 will then hold friction strip 82 stationary and the setting of the brake band will move the strip 75 and the friction plate 79 counterclockwise in relation to the strip 84. In other words, the strip 84 will thread through the friction surface presented by the plate 79, the upturned ends 75, 76, and the top of plate 78. When the brake is released the strip 84 will not return to its former position. In this new position the spring 87 will move the brake band and related parts counterclockwise the distance of the clearance between the projection 73 and the end of the slot 86 of strip 83. In other words, after this moving of the parts takes place the brake band will have the same clearance with the friction lining and will have the same amount of play to permit the brake to be set and released. In this way the centering device gradually rotates as the brake lining wears while permitting the desired amount of movement between the "set" and "released" positions of the brake.

The advantage of the centering device and the construction of the operation parts of the brake band permit one to adjust the brake by external connections such as in the brake rod, not shown, and it is unnecessary to make any adjustments inside of the brake drum itself. The adjustment of the brake band is therefore quite simple and is readily accomplished.

During this setting action of the brake while the aircraft is landing air is forced through the opening 48 between the faring 47 and the wheel rim and passes around the brake parts to cool them. This is an important feature as the braking effort required to bring an airplane to a standstill is such as to otherwise intensively heat the braking parts.

Since the brake band was originally formed to have a spiral shape of greater radial differential, as shown in Fig. 3, before it is placed inside the brake drum, the band itself has a stress to release itself from the braking surface entirely independent of external springs such as springs 69 and 87 and this stress is greatest in the free end of the brake band and gradually decreases towards the stationary end. This stress in the band tends to "peel" the brake band off of the friction surface from the free end towards the stationary end, thus insuring removal of the brake band as soon as release of pressure on the brake lever permits it. By constructing the brake band so that there is always a tendency to assume a spiral shape with greater differential radii, even in released position, I secure a marked result in the application of continuous internal brake bands to wheels of vehicles. Internal brake bands of prior construction have heretofore been unsatisfactory and I find this improvement alone has converted an unsuccessful brake into one that is more efficient and satisfactory in operation than any other type of brake.

The operation of the brake would be exactly the same when applied to the wheel of an automobile or other vehicle, either of the construction shown or any other construction. The ready release of the band and the freedom from internal adjustment of the brake would render it of special importance with any vehicle wheel in which it is used.

Having described my invention, what I claim is:

1. In brakes, a brake drum, an anchor within the drum, a flexible band having one end secured to the anchor, and means to move the other end within a circle having its axis substantially parallel to the axis of the drum, said circle being wholly within the drum whereby the movable end of the band and drum cannot be brought into contact.

2. In brakes, a brake drum, an anchor within the drum, a spiral band having one end secured to the anchor, and means to move the other end within a circle having its axis substantially parallel to the axis of the drum, said circle being wholly within the drum whereby the movable end of the band and drum cannot be brought into contact.

3. In brakes, a brake drum having a friction lining, an anchor within the drum, a flexible band having one end secured to the anchor, and means to move the other end within a circle having its axis substantially parallel to the axis of the drum, said circle being wholly within the friction lining whereby the movable end of the band and friction lining cannot be brought into contact.

4. In brakes, a brake drum having a friction lining, an anchor within the drum, a spiral band having one end secured to the anchor, and means to move the other end within a circle having its axis substantially parallel to the axis of the drum, said circle being wholly within the friction lining whereby the movable end of the band and friction lining cannot be brought into contact.

5. In brakes, a brake drum, a brake member having a surface adapted to engage said drum and an abutment, a strip frictionally engaging said brake member and having a slot therein, and an anchor extending through said slot and adapted to contact with said abutment.

6. In brakes, a brake drum, a brake member having a surface adapted to engage said drum and an abutment, a strip frictionally engaging said brake member and having a slot therein, and an anchor extending through said slot and adapted to contact with said abutment, and a spring urging the anchor to contact with one end of said slot.

7. In brakes, a brake drum, a brake member having a surface adapted to engage said drum, and having a slot therein, a member frictionally engaging the brake member, and having a slot therein, and an anchor extending through said slots.

8. In brakes, a brake drum, a brake member having a surface adapted to engage said drum, and having a slot therein, a member frictionally engaging the brake member and having a slot therein, an anchor extending through said slots, and a spring urging said anchor against one side of the slot in said strip.

9. In brakes, a brake drum, a band coacting with said drum, a strap secured to said band and having a slot, a strip frictionally engaging said strap and having a slot and an anchor of less length than the slots extending through both of said slots.

10. In brakes, a brake drum, a band coacting with said drum, a strap secured to said band and having a slot, a strip frictionally engaging said strap and having a slot and an anchor of less length than the slots extending through both of said slots, and a spring urging the anchor against one end of the slot in said strip.

11. In brakes, a brake drum, a band coacting with said drum, a strap secured to said band having a slot, a strip frictionally held in engagement with said strap, and having a slot shorter than the first mentioned slot, an anchor of less length than the shorter slot extending through both of said slots.

12. In brakes, a brake drum, a band coacting with said drum, a strap secured to said band having a slot, a strip frictionally held in engagement with said strap, and having a slot shorter than the first mentioned slot, an anchor of less length than the shorter slot extending through both of said slots, and a spring urging the strip to contact with one end of the said shorter slot.

13. In brakes, a brake drum having a bracket with upturned ends and a slot between said ends, slits in the intermediate portions of the bracket, a strip having a slot and passing through said slits and passing over said upturned ends and an anchor extending through said slots.

14. In brakes, a brake drum having a bracket with upturned ends and a slot between said ends, slits in the intermediate portions of the bracket, a strip having a slot passing through said slots and passing over said upturned ends and an anchor extending through said slots, and a spring urging said anchor in engagement with one end of the slot in said strip.

15. In brakes, a brake band, an anchor member, a stud in one end of said band, a bellcrank mounted on said stud and having the end of one lever arm extending into the anchor member, and a spring having one end secured to the other arm of the bellcrank and the other end secured to the anchor member.

16. In brakes, a wheel having a brake drum, a brake band in said drum flexible throughout its length, said band having an active contact surface of the greater part of a circle and being positioned with its stationary end nearest to the drum and the remaining parts progressively farther therefrom, and means to move the band to first bring only a portion of the band near its stationary end into contact with said drum and to progressively flex the other portions to bring said portions progressively into contact with the drum progressively toward the other end.

17. In brakes, a wheel having a brake drum, a brake band in said drum flexible throughout its length, said band having an active contact surface of the greater part of a circle and being positioned with its stationary end nearest to the drum and the remaining parts progressively farther therefrom and a lever arm connected to said band to move it toward the drum to first bring a portion of the band near its stationary end into contact with the drum and on further movement of the lever to progressively flex the other portions to bring said portions into contact therewith progressively toward the other end.

18. In brakes, a brake drum, a spiral brake band functioning with said drum of uniform cross section throughout its length, said band having an active contact surface of the greater part of a circle, and means to move said band to bring it into contact with the drum.

19. In brakes, a brake drum, a spiral brake band of uniform cross section throughout its length, said band having an active contact surface of the greater part of a circle and mounted in the drum, and means to move the band to bring the surface into gradual contact with the drum.

20. In brakes, a brake drum, a spiral band of uniform cross section throughout its length inside said drum having its outer end anchored in respect to the drum, said band having an active contact surface of the greater part of a circle, and means for moving the inner end to gradually bring the band into contact with the drum from the anchored end to the portion adjacent the free end.

21. In brakes, a brake drum, a spiral band of spring material of uniform cross section throughout its length, said band having an active contact surface of the greater part of a circle stressed to hold itself away from the drum and means to move the band into contact with the drum.

22. In brakes, a brake drum, a spiral band of spring material of uniform cross section throughout its length and expanded against its own spring tension when in released position, and means to further expand the band to bring it into contact with the drum.

23. In brakes, a brake drum, a spiral band of spring material of uniform cross section throughout its length and expanded against its own spring tension when in released position and forming with the drum a varying clearance from one end of the band to the other, and means to expand the band into contact with the drum.

24. In brakes, a brake drum, a spiral band of spring material of uniform cross section throughout its length and expanded against its own spring tension when in released position and forming with the drum a varying clearance from one end of the band to the other, and means to expand the band to bring it gradually into contact with the drum.

ALEXANDER C. HAMILTON.